United States Patent [19]

Schauer et al.

[11] Patent Number: 5,334,023

[45] Date of Patent: Aug. 2, 1994

[54] DEVICE FOR TRANSFERRING A SIGNAL BETWEEN TWO END POINTS WHICH ARE MOVABLE RELATIVE TO EACH OTHER

[75] Inventors: Friedrich Schauer, Heroldsberg; Andreas Neuner, Nuremberg, both of Fed. Rep. of Germany

[73] Assignee: Kabelmetal electro Gesellschaft mit beschränkter Haftung, Hanover, Fed. Rep. of Germany

[21] Appl. No.: 63,002

[22] Filed: May 17, 1993

[30] Foreign Application Priority Data

May 19, 1992 [DE] Fed. Rep. of Germany ....... 4216526

[51] Int. Cl.⁵ ................................. H01R 39/02
[52] U.S. Cl. ............................. 439/164; 439/15
[58] Field of Search ......................... 439/15, 164

[56] References Cited

U.S. PATENT DOCUMENTS

| | | | |
|---|---|---|---|
| 4,421,960 | 12/1983 | Arima et al. | 439/15 X |
| 4,722,690 | 2/1988 | Priede | 439/15 |
| 4,797,109 | 1/1989 | Wende | 439/15 |
| 5,248,260 | 9/1993 | Ida et al. | 439/15 |

FOREIGN PATENT DOCUMENTS 0417350 3/1991 European Pat. Off. .
0112682 5/1989 Japan ..................... 439/15

Primary Examiner—Eugene F. Desmond
Attorney, Agent, or Firm—Martin A. Farber

[57] ABSTRACT

A device for transferring a signal has two end points (6, 8) between which a conductor (10) extends in spiral turns and is arranged within a substantially circular cassette (K). The cassette (K) consists of two parts, a rotor (11) which is turnable about its axis and a stationary stator (12) which surrounds the circumference of the rotor and encloses the conductor (10). On the rotor (11) there is an outward protruding extension (15) for receiving a screw (16) which is displaceable in the axial direction of the cassette (K), and serves for a locking of rotor (11) and stator (12). There is also present on the rotor (11) a spring element (17) which is displaceable by means of a screw (16) and which, in mounting position of the cassette (K), is held firmly on the stator (12) and, in the working position of the cassette (K), is separated from the stator (12) by a space.

4 Claims, 2 Drawing Sheets

DEVICE FOR TRANSFERRING A SIGNAL BETWEEN TWO END POINTS WHICH ARE MOVABLE RELATIVE TO EACH OTHER

FIELD AND BACKGROUND OF THE INVENTION

The present invention relates to a device for transferring a signal between two end points between which a coiled conductor which is contained in a substantially circular cassette is arranged, and to which further extending conductors can be attached at the two end points, the length of the conductor being substantially greater than the distance between the two end points, and wherein at least one of the two end points is movable relative to the other, the cassette consisting of two parts, namely a stationary stator and a turnable rotor.

Such a device is described in European patent document EP-OS 0 417 350.

Such a device is needed, for instance, for transmitting a signal for releasing the collision-protection "air bag" of motor vehicles. It is arranged in the steering wheel of a motor vehicle for the transmission of an electrical or optical signal. "Conductor", as used in the invention, can therefore be an electrical conductor or an optical conductor. One essential problem in the case of this device is the transmission of a signal between stationary and moving parts of the motor vehicle. The wiper contacts or rings known for a long time for the transmission of current in such cases are subject to wear and are disadvantageous, particularly in the case of low current intensities due to the varying contact resistances.

In the known device according to the aforementioned EP-OS 0 417 350, electric current is used for the transmission of the signal. The transmission of the signal is effected by a ribbon conductor coiled, for instance, in the manner of a spring housing. Upon relative rotation of the two end points connected by the ribbon conductor, the coiled ribbon conductor "breathes" like the spring of a watch. The turns of the coiled ribbon conductor are contracted to a smaller diameter in one direction of rotation. In the opposite direction of rotation, they again return to a larger diameter. It is therefore important, for the installing of this device in the steering wheel of a motor vehicle, that the two end points have a very specific position with respect to each other with a corresponding position of the ribbon conductor, so that the predetermined rotations of the rotor are possible in both directions of rotation of the steering wheel without the ribbon conductor being torn off from the end points or otherwise damaged.

SUMMARY OF THE INVENTION

It is an object of the invention so to develop the aforementioned device that the position of the end points required for its installation can be maintained in simple manner.

According to the invention:
an outwardly protruding projection (15) for the reception of a screw (16) which is displaceable in axial direction of the cassette (K) is arranged on the rotor (11); and
there is also arranged on the rotor (11) a spring element (17) which is displaceable by the screw (16) and is applied firmly on the stator (12) in the mounting position of the cassette (K) while, in the working position of the cassette (K), it is separated by a distance from the stator (12).

In this device, the rotor and stator of the cassette are fixed by the spring element in the working position of the cassette in the mounting position which is intended for the installation into the steering wheel of an automotive vehicle. This position is retained until the spring element moves back into its position of rest by a turning or loosening of the screw so that the spring element is separated from the stator of the cassette by a space. The spring element can therefore not wipe against the stator in its position of rest. Wiping noises can therefore not occur. It is essential in this connection that locking by the outward protruding projection which is established by screw and spring element be arranged on the outside of the cassette. The space within the cassette or stator in which the turns of the conductor are arranged is therefore not encroached upon for the locking. The smallest coil diameter which determines the length of the line can accordingly be kept as small as desired without being influenced by the elements of the locking.

According to a feature of the invention the spring element (17) is a leaf spring fastened to the rotor (11).

According to another feature of invention, in the case of a rotor (11) consisting of plastic, the spring element (17) is spring formed by extrusion on and integral with the rotor.

BRIEF DESCRIPTION OF THE DRAWINGS

With the above and other objects and advantages in view, the present invention will become more clearly understood in connection with the detailed description of a preferred embodiment when considered with the accompanying drawings, of which.

DETAILED DESCRIPTION OF THE PREFERRED EMBODIMENT

The invention will be described below with respect to a cassette in which a ribbon conductor having electric wires is arranged. Instead of the ribbon conductor, a conductor containing at least one photoconductor could, however, also be used. A combined conductor with electrical and optical conductors could also be used.

Figure 1:
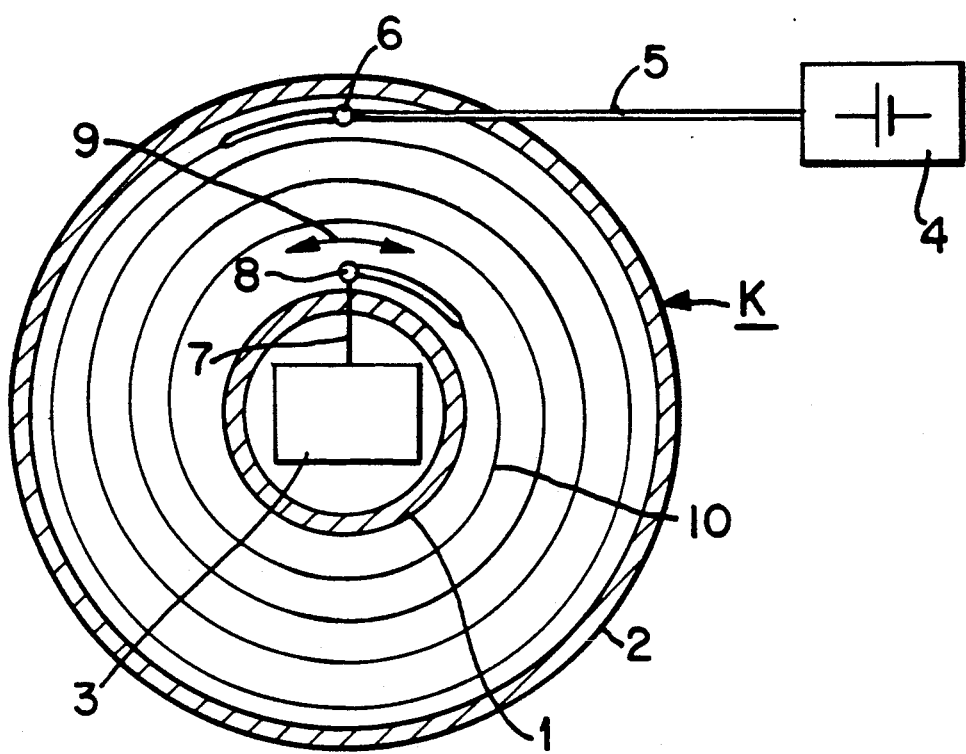
FIG. 1 ia a diagrammatic cross section through a cassette having a device in accordance with the invention.

FIG. 1 shows diagrammatically two walls 1 and 2 of a cassette K, the walls being, for instance, circular. It is intended for installation in a steering wheel of a motor vehicle. For the supplying of current to an electronic unit 3 by the signal of which an air bag can be released, the cassette K is connected to the battery 4 of the motor vehicle. The battery 4 is connected by an electric wire 5 to an end point 6, developed as fixed point, of the cassette K. The electronic unit 3 is connected by an electric wire 7 to an end point 8 of the cassette K, which end point is movable in the direction shown by the double-ended arrow 9. In principle, the end point 8 could also be stationary and the end point 6 be movable. Both end points 6 and 8 could also be movable.

Between the two end points 6 and 8, a ribbon conductor 10 containing at least two electric wires is arranged. The wires are preferably developed as flat wires. This embodiment of the ribbon conductor 10 is particularly thin and therefore takes up very little space. In principle, the ribbon conductor 10, however, could also have round wires. The construction of the ribbon conductor 10 and the nature of its connection to the end points 6 and 8 are not shown in detail. In principle, several variants thereof are known and are not of importance here.

The ribbon conductor 10 can, as shown in FIG. 1, be arranged in the cassette K in several turns between the two end points 6 and 8, namely, in the manner of a watch spring, in a housing. Although the number of revolutions of a steering wheel is limited to about six, more than six turns are to be provided for the ribbon conductor 10. The turning movement of the end point 8 is then not substantially noticeable for an individual turn of the ribbon conductor 10. The diameter of the coil which consists of all turns of the ribbon conductor 10 is then merely made smaller or larger.

The cassette K consists of a rotor 11 and of a stator 12 which surrounds the latter on its peripheral surface. The rotor 11 is rotatable about the axis A of the cassette. It bears, for instance, the end point 8 to which an electric wire can be connected. The stationary stator 12 encloses the ribbon conductor 10 only a few turns of which are shown diagrammatically in FIG. 3. In this case, it bears the end point 6 to which an electric wire 14 can be connected. On the rotor 11 there is arranged an outward protruding projection 15 which serves to receive a screw 16. The screw 16 is displaceable in the direction of the axis A of the cassette K. A spring element 17 against which the tip of the screw 16 rests is also arranged on the rotor 11.

Figure 2:
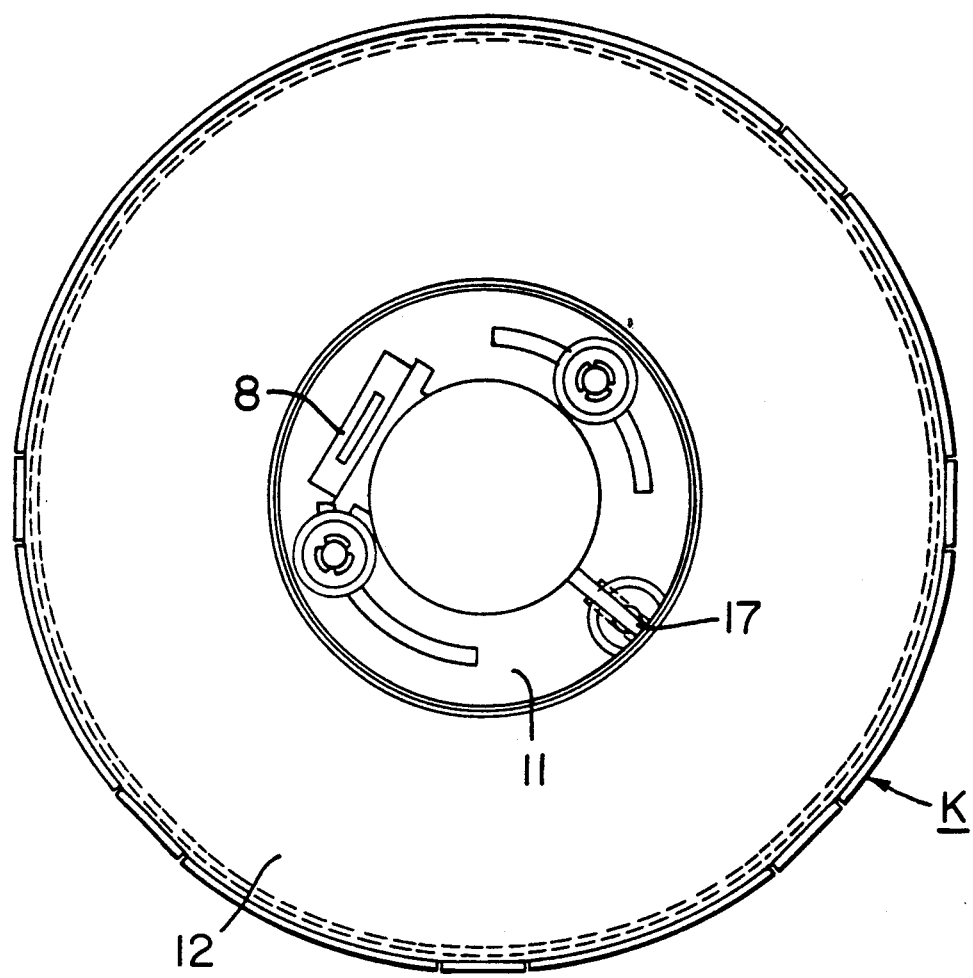
FIG. 2 is a plan view of a closed cassette.
Figure 3:
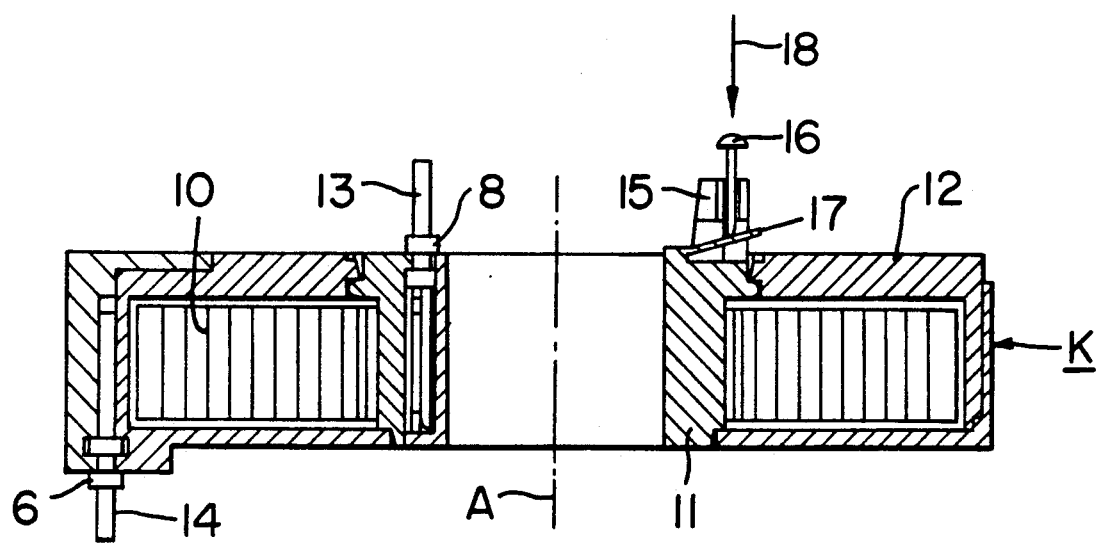
FIG. 3 is a cross section through the cassette of FIG. 2 taken along a central axis of the cassette.

In FIG. 2 the screw 16 has not been shown. FIG. 3 shows the position of rest of screw 16 and spring element 17 in which the rotor can turn unimpeded in the working position of the cassette K. By the turning of the screw 16, the screw is shifted in the direction of the arrow 18 up into its working position. In this connection it presses against the spring element 7 until the latter comes against the stator 12. In the mounting position of the cassette K the spring element 17 engages, for instance, into a depression in the stator 12 so that the rotor 11 is fixed in non-turnable manner on the stator 12. This result can also be obtained if projections for engagement with the spring element 17, in the mounting position of the cassette K, are provided on the stator 12. In order to eliminate the locking of the rotor 11 on the stator 12, the screw 16 need only be turned in the opposite direction, so that it is moved in the direction opposite the arrow 18. The spring element 17 then returns into the position thereof shown in FIG. 3. As spring element there can be used, for instance, a leaf spring which is fastened to the rotor 11. If the rotor 11 is made of plastic, the spring element 17 can also be developed as a spring which is extruded on it, as can be noted from FIG. 3.

We claim:

1. A device for transferring a signal between two end points comprising:

a substantially circular cassette, and a coiled conductor which is contained in the cassette and interconnects the two end points, wherein the two end points are arranged on the cassette for receiving further extending conductors attachable at the two end points, the length of said conductor being substantially greater than a distance between the two end points, and at least one of the two end points being movable relative to the other, the cassette comprising a stationary stator and a turnable rotor, the device further comprising:

a screw and an outwardly protruding projection for reception of the screw, the screw being displaceable in axial direction of the cassette, the projection being located radially outward of a center of the rotor and adjacent to an interface with the stator and extending from the rotor; and a spring element disposed on the rotor, the spring element being displaceable by the screw upon a contacting of the spring element by the screw to be applied firmly against the stator in a mounting position of the cassette; and wherein in a working position of the cassette, the spring element is separated by a distance from the stator upon retraction of the screw.

2. A device according to claim 1, wherein the spring element is a leaf spring fastened to the rotor.

3. A device according to claim 1, wherein the rotor is made of plastic, and the spring element is formed in unitary construction with the rotor.

4. A device for transferring a signal between two end points comprising:

a substantially circular cassette, and a coiled conductor which is contained in the cassette and interconnects the two end points, wherein the two end points are arranged on the cassette for receiving further extending conductors attachable at the two end points, the length of said conductor being substantially greater than a distance between the two end points, and at least one of the two end points being movable relative to the other, the cassette comprising a stationary stator and a turnable rotor, the device further comprising:

a screw displaceable in axial direction of the cassette, the screw being located radially outward of a center of the rotor and adjacent to an interface with the stator and extending from the rotor; and a spring element disposed on the rotor and extending over the interface, the spring element being displaceable by the screw upon a contacting of the spring element by the screw to be applied firmly against the stator in a mounting position of the cassette; and wherein in a working position of the cassette, the spring element is separated by a distance from the stator upon retraction of the screw.

* * * * *